United States Patent
Kondo

(10) Patent No.: US 7,574,945 B2
(45) Date of Patent: Aug. 18, 2009

(54) MOUNTING STRUCTURE FOR ROTARY MEMBER

(75) Inventor: Ryoji Kondo, Nagoya (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 476 days.

(21) Appl. No.: 10/594,989

(22) PCT Filed: Jan. 12, 2005

(86) PCT No.: PCT/JP2005/000208

§ 371 (c)(1),
(2), (4) Date: Sep. 29, 2006

(87) PCT Pub. No.: WO2005/100824

PCT Pub. Date: Oct. 27, 2005

(65) Prior Publication Data

US 2008/0034906 A1    Feb. 14, 2008

(30) Foreign Application Priority Data

Mar. 31, 2004    (JP)    ............... 2004-106902

(51) Int. Cl.
*F16H 55/17* (2006.01)
*F16D 1/06* (2006.01)
(52) U.S. Cl. ................................ 74/724; 403/359.6
(58) Field of Classification Search ............ 74/431, 74/724; 403/359.1, 359.2, 359.3, 359.4, 403/359.6, DIG. 7; 301/36.3, 131, 111.02; 384/903
See application file for complete search history.

(56) References Cited

U.S. PATENT DOCUMENTS

| 3,066,000 | A | * | 11/1962 | James et al. | ............... 348/537 |
| 3,829,227 | A | | 8/1974 | Derman | |
| 4,019,824 | A | | 4/1977 | Percy | |
| 4,200,407 | A | | 4/1980 | Bianco | |
| 4,639,163 | A | * | 1/1987 | Buthe et al. | ............... 403/322.2 |
| 5,458,430 | A | | 10/1995 | Pitchford | |
| 5,640,884 | A | * | 6/1997 | Fujiu et al. | ............... 74/492 |
| 5,716,156 | A | * | 2/1998 | Bayer et al. | ............... 403/282 |
| 5,718,151 | A | * | 2/1998 | Parrish et al. | ............... 74/552 |
| 5,816,101 | A | | 10/1998 | Weston | |
| 6,428,236 | B2 | * | 8/2002 | Aota et al. | ............... 403/359.5 |

(Continued)

FOREIGN PATENT DOCUMENTS

DE    1 575 513 A    1/1970

(Continued)

*Primary Examiner*—Richard M. Lorence
*Assistant Examiner*—Edwin A. Young
(74) *Attorney, Agent, or Firm*—Global IP Counselors, LLP

(57) ABSTRACT

A rotary member mounting structure is configured for mounting a speedometer worm gear closely adjacent to a drive gear that is supported on an output shaft. The rotary member mounting structure basically has a rotation preventing structure, a first fastening ring and a second fastening ring. The rotation preventing structure is configured to prevent the drive gear from rotating relative to the output shaft 1 and to prevent the worm gear from rotating relative to the output shaft. The first fastening ring is configured to prevent the drive gear from sliding axially toward the worm gear and to prevent the worm gear from sliding axially toward the drive gear; and a second fastening ring is configured to prevent the worm gear from sliding axially in the direction opposite (i.e., away from) the drive gear.

10 Claims, 2 Drawing Sheets

U.S. PATENT DOCUMENTS

2005/0254890 A1 * 11/2005 Schulz et al. ............ 403/359.1

FOREIGN PATENT DOCUMENTS

| DE | 72 13 391 U | 11/1972 |
| GB | 29198 A | 5/1912 |
| GB | 1131377 A | 10/1968 |
| JP | 51-24458 A | 2/1976 |
| JP | 58-49501 A | 3/1983 |
| JP | 60-121363 A | 6/1985 |
| JP | 62-68026 U | 4/1987 |
| JP | H01-053750 A | 11/1989 |
| JP | 2-101164 U | 8/1990 |
| WO | WO-93/16302 A1 | 8/1993 |

* cited by examiner

MOUNTING STRUCTURE FOR ROTARY MEMBER

CROSS-REFERENCE TO RELATED APPLICATIONS

This U.S. National stage application claims priority under 35 U.S.C. §119(a) to Japanese Patent Application No. 2004-106902, filed in Japan on Mar. 31, 2004, the entire contents of which are hereby incorporated by reference.

BACKGROUND OF THE INVENTION

1. Field of the Invention

The present invention relates generally to a mounting structure for a rotary member.

2. Background Information

In a conventional mounting structure for a speedometer drive gear, stopper rings are installed onto the main shaft of the transmission on both sides of the speedometer drive gear in order to prevent the speedometer drive gear from sliding in the axial direction and a ball is installed between a key groove formed in the shaft hole of the speedometer drive gear and a groove portion formed in the main shaft in order to prevent the speedometer drive gear from turning about the main shaft (see, Japanese Examined Patent Application Publication H1-53750 (page 1, FIG. 2)). In such a mounting structure, stopper ring attachment grooves are provided in the main shaft on both sides of the speedometer drive gear mounting position. In order to install the speedometer drive gear onto the main shaft, first, a first stopper ring is installed into the stopper ring installation groove located farther from the installer. Then, the speedometer drive gear is fitted onto the outside of the main shaft and a second stopper ring is installed into the stopper ring installation groove located closer to the installer.

SUMMARY OF THE INVENTION

With the conventional mounting structure described above, it is necessary to form a key groove in the shaft hole of the speedometer drive gear and a groove portion in the main shaft in order to prevent the speedometer drive gear from turning about the main shaft. Additionally, a ball for realizing the rotation prevention must be provided as a separate part. Consequently, the number of parts and the amount of work required for assembly are larger than they might be. Also, the work of installing the ball into the gap between the key groove of the shaft hole of the speedometer drive gear and the groove portion of the main shaft when the speedometer drive gear is fitted onto the outside of the main shaft is complex, thus causing the installation of the speedometer drive gear to require a large amount of work and incur a higher cost. This, in turn, causes the end product to become more expensive. Additionally, in addition to a stopper ring(s) for preventing a gear-shifting drive gear supported on the main shaft from sliding in the axial direction, the conventional mounting structure requires two stopper rings for preventing the speedometer drive gear from sliding in the axial direction. This, too, causes the number of parts and the amount of work required for assembly to be larger than they might be. Furthermore, the first stopper ring sometimes becomes unintentionally inserted into the stopper ring installation groove located closer to the installer when the installer is attempting to install the first stopper ring into the stopper ring installation groove located farther away and time and effort are required to remove the first stopper ring from the closer stopper ring installation groove. Although it is feasible to pass the first stopper ring over the closer stopper ring installation groove while expanding the first stopper ring into a widened state in order to prevent the first stopper ring from becoming caught in the closer stopper ring installation groove, installing the first stopper ring in this manner also requires much time and effort.

In order to solve the previously described problems of the prior art, the present invention offers a rotary member mounting structure that basically comprises a rotary shaft, a first rotary member, a second rotary member, a first slide preventing member and a second slide preventing member. The rotary shaft includes a the rotation preventing structure, a larger diameter portion with a first installation groove and a smaller diameter portion with a second installation groove. The first rotary member is supported on the larger diameter portion of the rotary shaft and engaged with the rotation preventing structure. The second rotary member is supported on the smaller diameter portion of the rotary shaft closely adjacent to a first rotary member and engaged with the rotation preventing structure. The first slide preventing member is installed in the first installation groove to prevent the first rotary member from sliding axially toward the second rotary member and to prevent the second rotary member from sliding axially toward the first rotary member. The second slide preventing member is installed in the second installation groove to prevent the second rotary member from sliding axially in a direction away from the first rotary member.

Other aspects of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
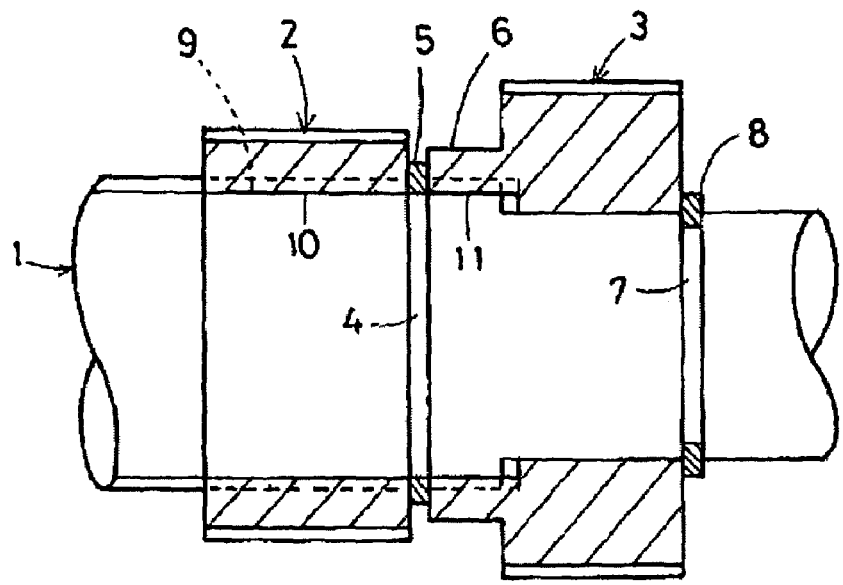
FIG. 1 is a lateral cross sectional view illustrating a rotary member mounting structure in accordance with an embodiment of the present invention.

An embodiment of the present invention will now be explained with reference to FIGS. 1 and 2. As shown in FIG. 1, the rotary shaft is an output shaft 1 of a transmission, the first rotary member is a reverse drive gear 2 supported on the output shaft 1 at a position located farther along the output shaft 1 in the assembly direction (leftward in FIG. 1), and the second rotary member is a speedometer worm gear 3 mounted on the output shaft 1 at a position that is closely adjacent to the reverse drive gear 2 and closer in the assembly direction (rightward of the reverse drive gear 2 in FIG. 1).

The diameter of the output shaft 1 is larger at the mounting position of the reverse drive gear 2 and a rotation prevention position of the speedometer worm gear 3 and an annular first snap ring installation groove 4 is provided in the larger diameter portion of the output shaft 1 at a position located between the mounting position of the reverse drive gear 2 and the rotation prevention position of the speedometer worm gear 3. A larger-diameter first fastening ring 5 is installed into the first snap ring installation groove 4. The first fastening ring 5 serves as a first slide preventing member that prevents the reverse drive gear 2 from sliding axially toward the speedometer worm gear 3 and prevents the speedometer worm gear 3 from sliding axially toward the reverse drive gear 2. The first fastening ring 5 touches against the closer end portion of the reverse drive gear 2 and against the farther end part of a rotation preventing boss 6 of the speedometer worm gear 3. The rotation preventing boss 6 is a substantially cylindrical boss section that protrudes from the speedometer worm gear 3 at the rotation prevention position thereof and serves as a rotation preventing portion.

The diameter of the output shaft 1 is smaller at the mounting position of the speedometer worm gear 3 and an annular second snap ring installation groove 7 is provided near the closer end of the smaller-diameter portion of the output shaft 1. A smaller-diameter second fastening ring 8 serving as a second slide preventing member for preventing the speedometer worm gear 3 from sliding axially in the opposite direction of (away from) the reverse drive gear 2 is installed in the second snap ring installation groove 7. The second fastening ring 8 touches against the closer end portion of the speedometer worm gear 3. Thus, the speedometer worm gear 3 is prevented from sliding in the axial directions because the farther end part thereof touches against the first fastening ring 5 and the closer end part thereof touches against the second fastening ring 8.

Figure 2:
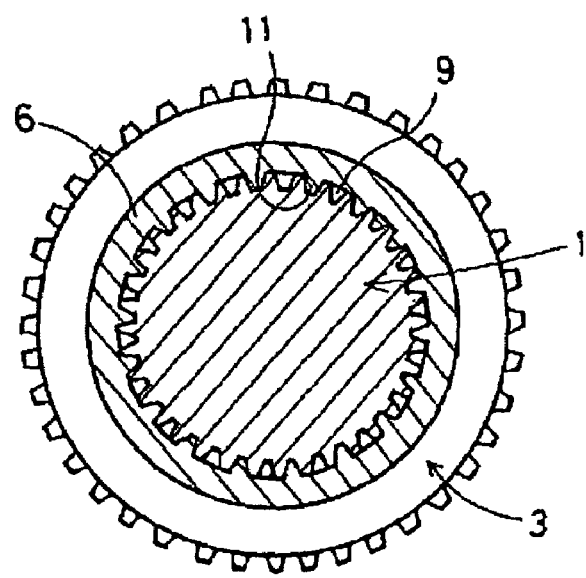
FIG. 2 is a transverse cross sectional view illustrating a rotary member mounting structure in accordance with the same embodiment of the present invention.

As shown in FIG. 2, several spline grooves 9 are provided in the external surface of the output shaft 1 and arranged along the axial direction of the output shaft 1 at the mounting position of the reverse drive gear 2 and the rotation prevention position of the speedometer worm gear 3. Meanwhile, several splines 10 (elongated protrusions) are provided on an internal surface of the reverse drive gear 2 and configured and arranged to mesh with the spline grooves 9 of the output shaft 1. Similarly, several rotation preventing splines 11 (rotation preventing elongated protrusions) are provided on an internal surface of the rotation preventing boss 6 of the speedometer worm gear 3 and configured and arranged to mesh with every other of the spline grooves 9 of the output shaft 1. Thus, the reverse drive gear 2 is prevented from rotating relative to the output shaft 1 by the meshing of the splines 10 of the reverse drive gear 2 with the spline grooves 9 of the output shaft 1, and the speedometer worm gear 3 is prevented from rotating relative to the output shaft 1 by the meshing of the rotation preventing splines 11 of the speedometer worm gear 3 with every other of the spline grooves 9 of the output shaft 1.

When the reverse drive gear 2 and the speedometer worm gear 3 are installed onto the output shaft 1 of the transmission, first, the splines 10 of the reverse drive gear 2 are aligned with the spline grooves 9 of the output shaft 1 at the ends of the spline grooves 9 that are closer to the installer (i.e., closer to the smaller-diameter portion of the output shaft 1) and the reverse drive gear 2 is fitted onto the outside of the output shaft 1 such that the splines 10 mesh with the spline grooves 9. Then, the first fastening ring 5 is passed over the closer end of the larger diameter portion of the output shaft 1 and fitted into the first snap ring installation groove 4 such that it touches against the closer end portion of the reverse drive gear 2. Next, the rotation preventing splines 11 of the rotation preventing boss 6 of the speedometer worm gear 3 are aligned with every other of the spline grooves 9 of the output shaft 1 at the ends of the spline grooves 9 that are closer to the installer and the speedometer worm gear 3 is fitted onto the outside of the output shaft 1 such that the rotation preventing splines 11 mesh with the respective spline grooves 9 and the farther end of the rotation preventing boss 6 of the speedometer worm gear 3 touches against the first fastening ring 5. Finally, the second fastening ring 8 is fitted over the output shaft 1 from the closer end of the output shaft 1 and fitted into the second snap ring installation groove 7 of the output shaft 1 such that it touches against the closer end portion of the speedometer worm gear 3.

By meshing the splines 10 of the reverse drive gear 2 with the spline grooves 9 of the output shaft 1 and meshing the rotation preventing splines 11 of the rotation preventing boss 6 of the speedometer worm gear 3 with every other of the spline grooves 9 of the output shaft 1, the reverse drive gear 2 can be prevented from rotating relative to the output shaft 1 and the speedometer worm gear 3 can be prevented from rotating relative to the output shaft 1. That is, since both the rotation prevention of the reverse drive gear 2 and the rotation prevention of the speedometer worm gear 3 can be accomplished with a single common rotation preventing means, the rotation prevention requires fewer parts and man hours and the assembly work is simpler than the conventional structure in which a key groove is formed in the shaft hole of the speedometer drive gear, a separate groove is formed in the main shaft, and a separate rotation preventing ball needs to be provided.

Also, a single first fastening ring 5 serving as a slide preventing member can prevent the reverse drive gear 2 from sliding axially toward the speedometer worm gear 3 and also prevent the speedometer worm gear 3 from sliding axially toward the reverse drive gear 2. Thus, since the same slide preventing member can be used for both the reverse drive gear 2 and the speedometer worm gear 3, the number of slide preventing members is smaller than in the convention structure in which it is necessary to provide two stopper rings in order to prevent sliding of the speedometer drive gear. Additionally, only a single second fastening ring 8 is needed to prevent the speedometer worm gear 3 from sliding axially away from the reverse drive gear 2. In short, since fewer slide preventing members are needed, this rotary member mounting structure requires fewer parts and man hours and the assembly work is much simpler than the convention structure.

When the first fastening ring 5 is installed into the first snap ring installation groove 4 (which is located farther from the installer), the first fastening ring 5 can be passed over the second snap ring installation groove 7 (located closer to the installer) in its natural state because it has a larger diameter. Consequently, the first fastening ring 5 will not get stuck in the second snap ring installation groove 7 and it is not necessary to spread the first fastening ring 5 into a widened state when installing it. As a result, the time and effort required to install the first fastening ring 5 can be greatly reduced.

The speedometer worm gear 3 can be prevented from rotating with respect to the output shaft 1 by the meshing of the rotation preventing splines 11 of the rotation preventing boss 6 of the speedometer worm gear 3 with every other of the spline grooves 9 of the output shaft 1. Also, unlike the conventional mounting structure, it is not necessary to provide a separate groove in the output shaft 1 and install a ball between the output shaft 1 and the speedometer worm gear 3 in order to prevent rotation of the speedometer worm gear 3. As a result, the installation of the second rotary member 3 onto the output shaft 1 is much simpler. Furthermore, fewer parts and man hours are required and the effort and cost associated with the assembly work can be greatly reduced.

Figure 3:
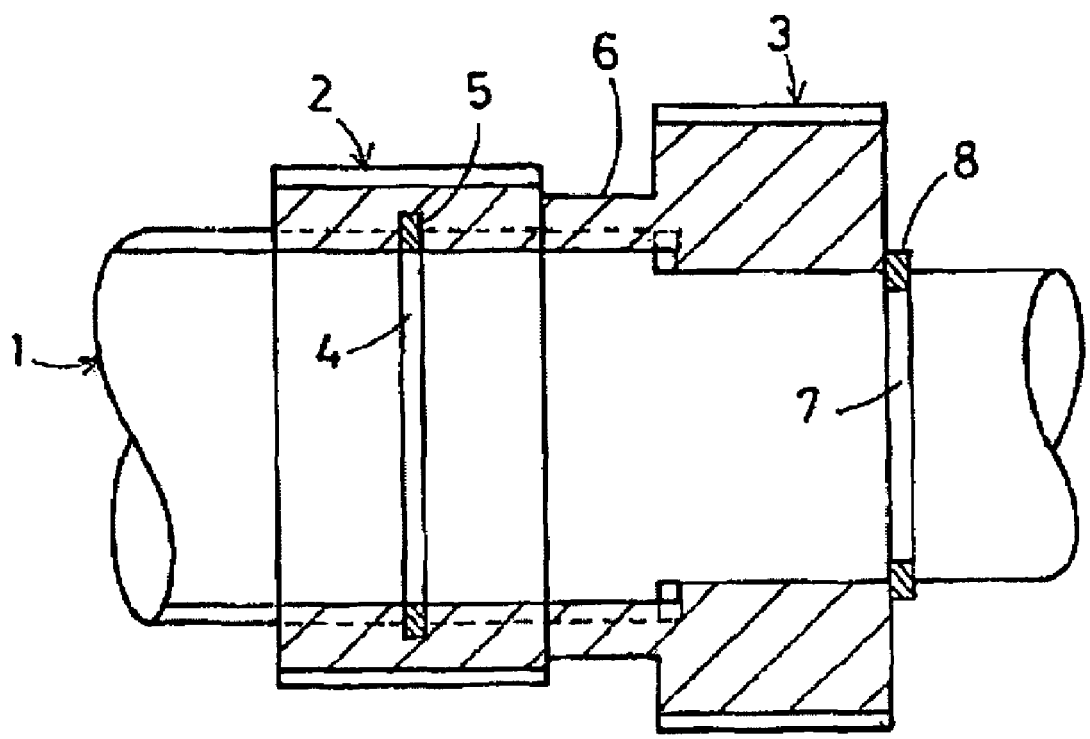
FIG. 3 is a lateral cross sectional view illustrating a rotary member mounting structure in accordance with another embodiment of the present invention.

Although the preceding embodiment has been used to explain the present invention, the scope of the invention is not limited to specific features of the embodiment. Various changes and modifications can be made within the scope of the claims as required depending on the objectives of the designer. For example, in the rotary member mounting structure of the preceding embodiment, the first fastening ring 5 is installed such that it touches against the closer end part of the reverse drive gear 2 and against the large-diameter rotation preventing boss 6 provided on the farther end part of the speedometer worm gear 3. As a result, the reverse drive gear 2 is prevented from sliding axially toward the speedometer worm gear 3 and the speedometer worm gear 3 is prevented from sliding axially toward the reverse drive gear 2. However, there are other feasible arrangements for preventing axial sliding of the rotary members. FIG. 3 shows an alternative example in which annular first installation grooves 4 are formed in both the external surface of the output shaft and the internal surface of the reverse drive gear 2 and a first fastening ring 5 is installed into the first installation grooves, thereby preventing the reverse drive gear 2 from sliding in either of the axial directions. Meanwhile, the rotation preventing boss 6 of the speedometer worm gear 3 is abutted against the closer end of the reverse drive gear 2 so as to prevent the speedometer worm gear 3 from sliding axially toward the reverse drive gear 2.

In the rotary member mounting structure of the preceding embodiment, the reverse drive gear 2 and the speedometer worm gear 3 are prevented from rotating with respect to the output shaft 1 by meshing the splines 10 of the reverse drive gear 2 and the rotation preventing splines 11 of the speedometer worm gear 3 with the spline grooves 9 of the output shaft 1. However, any other structure that can prevent the reverse drive gear 2 and the speedometer worm gear 3 from rotating relative to the output shaft 1 is acceptable. For example, one or more contact surfaces (not shown in figures) can be provided on each of the reverse drive gear 2, the speedometer worm gear 3, and the output shaft 1 and the contact surfaces can be configured and arranged to mate with one another in such a fashion that the reverse drive gear 2 and the speedometer worm gear 3 are prevented from rotating with respect to the output shaft 1. It is also acceptable to use a key connection comprising a key groove and a key to prevent the rotation of the reverse drive gear 2 and the speedometer worm gear 3 with respect to the output shaft 1.

In the rotary member mounting structure of the preceding embodiment, the rotation preventing boss 6 serving as the rotation preventing portion provided at the rotation prevention position of the speedometer worm gear 3 is cylindrical in shape. However, the shape of the rotation preventing portion 6 does not necessarily have to be cylindrical. Any shape is acceptable so long as the elongated rotation preventing protrusions 11 on the internal surface of the rotation preventing portion 6 can prevent the speedometer worm gear 3 from rotating relative to the output shaft 1. For example, the rotation preventing portion 6 can have a semi-cylindrical shape.

In the rotary member mounting structure of the preceding embodiment, the rotation prevention splines 11 provided on the internal surface of the speedometer worm gear 3 (second rotary member) are of such a number and arrangement that a spline 11 meshes with every other of the spline grooves 9 of the output shaft 1 (grooves of the rotary shaft). However, it is acceptable to provide such a number and arrangement of rotation preventing splines 11 that a spline 11 meshes with each and every one of the spline grooves 9 of the output shaft 1. It is also acceptable to provide only one or any other number of rotation prevention splines 11 so long as they are arranged and configured to mesh with one or more of the spline grooves 9 of the output shaft 1. Additionally, the elongated protrusions 10 provided on the internal surface of the reverse drive gear 2 (first rotary member) are not limited to being splines and can be, for example, some other form of protrusion (not shown in figures). Similarly, the elongated rotation-preventing protrusions 11 provided on the internal surface of the speedometer worm gear 3 (second rotary member) are not limited to being rotation preventing splines and can be, for example, some other form of rotation preventing protrusion (not shown in figures). Furthermore, the first rotary member 2 is not limited to being a reverse drive gear and can be, for example, forward drive gear or a synchronizing hub of a synchronizing mechanism.

The present invention makes the work of assembling a rotary member mounting structure extremely easy and can reduce the number of parts and man hours. The effort and cost associated with the assembly work can be greatly reduced. Therefore, a rotary member mounting structure in accordance with the present invention is applicable in industry. In particular, with a rotary member mounting structure in accordance with the present invention, a single rotation preventing structure can prevent both rotation of the first and second rotary members 2 and 3 with respect to the rotary shaft 1. Thus, since rotation prevention of the first and second rotary members 2 and 3 can be accomplished with a common structure, the rotation prevention structure requires fewer parts and man hours and the assembly work is simpler than the conventional structure in which a key groove is formed in the shaft hole of the speedometer drive gear, a separate groove is formed in the main shaft, and a rotation preventing ball is also provided separately. Also, a single first slide preventing member 5 can prevent the first rotary member 2 from sliding axially toward the second rotary member 3 and prevent the second rotary member 3 from sliding axially toward the first rotary member 2. Thus, since the same slide preventing member can be used for both the first rotary member 2 and the second rotary member 3, the number of slide preventing members is smaller than in the convention structure in which it is necessary to provide two stopper rings in order to prevent sliding of the speedometer drive gear. Additionally, in this rotary member mounting structure, only a single second slide preventing member 8 is needed to prevent the second rotary member 3 from sliding axially away from the first rotary member 2. In short, since fewer slide preventing members are needed, this rotary member mounting structure requires fewer parts and man hours and the assembly work is much simpler than the convention structure. If the rotary member mounting structure is configured such that the diameter of the rotary shaft 1 is larger at the mounting position of the first rotary member 2 and the rotation prevention position of the second rotary member 3 and smaller at the mounting position of the second rotary member 3, the first slide preventing member 5 that fits into the first snap ring installation groove 4 is a larger-diameter first fastening ring, and the second slide preventing member 8 that fits into the second snap ring installation groove 7 is a smaller-diameter second fastening ring, then when the first fastening ring 5 is installed into the first snap ring installation groove 4 (which is located farther from the installer), the first fastening ring 5 can be passed over the second snap ring installation groove 7 (located closer to the installer) in its natural state because it has a larger diameter. Consequently, the first fastening ring 5 will not get stuck in the second snap ring installation groove 7 and it is not necessary to spread the first fastening ring 5 into a widened state when installing it. As a result, the time and effort required to install the first fastening ring 5 can be greatly reduced. Meanwhile, if the rotation preventing means is configured such that the first rotary member 2 and the second rotary member 3 are prevented from rotating relative to the rotary shaft 1 by the meshing of an elongated protrusion(s) 10 of the first rotary member 2 and an elongated rotation preventing protrusion(s) 11 of the second rotary member 3 with a groove(s) 9 formed in the rotary shaft 1, then the second rotary member 3 can be prevented from rotating with respect to the rotary shaft 1 by the meshing of the rotation preventing protrusion 11 of the second rotary member 3 with the groove 9 of the rotary shaft 1 and, unlike the conventional mounting structure, it is not necessary to provide a separate groove in the rotary shaft and install a ball between the rotary shaft 1 and the second rotary member 3 in order to prevent rotation of the second rotary member 3. As a result, the installation of the second rotary member 3 onto the rotary shaft 1 is much simpler. Furthermore, the number of parts and man hours can be reduced and the amount of effort and cost associated with the assembly work can be greatly decreased.

The invention claimed is:

1. A rotary member mounting structure comprising:
   a rotary shaft including a rotation preventing structure, a larger diameter portion with a first installation groove and a smaller diameter portion with a second installation groove;
   a first rotary member supported on the larger diameter portion of the rotary shaft and engaged with the rotation preventing structure;
   a second rotary member supported on the smaller diameter portion of the rotary shaft closely adjacent to the first rotary member and engaged with the rotation preventing structure;
   a first slide preventing member installed in the first installation groove to prevent the first rotary member from sliding axially toward the second rotary member and to prevent the second rotary member from sliding axially toward the first rotary member; and
   a second slide preventing member installed in the second installation groove to prevent the second rotary member from sliding axially in a direction away from the first rotary member.

2. The rotary member mounting structure as recited in claim 1, wherein
   the rotation preventing structure of the rotary shaft includes at least one axially extending groove provided in an external surface of the rotary shaft on the larger diameter portion;
   the first rotary member includes at least one elongated protrusion provided on an internal surface of the first rotary member that meshes with the at least one axially extending groove of the rotary shaft; and
   the second rotary member includes at least one elongated rotation preventing protrusion provided on an internal surface of the second rotary member that meshes with the at least one axially extending groove of the rotary shaft.

3. The rotary member mounting structure as recited in claim 2, wherein
   the at least one axially extending groove of the rotary shaft includes a plurality of spline grooves;
   the at least one elongated protrusion of the first rotary member includes a plurality of splines; and
   the at least one rotation preventing protrusion of the second rotary member includes a plurality of rotation preventing splines.

4. The rotary member mounting structure as recited in claim 2, wherein
   the rotary shaft is an output shaft of a transmission;
   the first rotary member is a drive gear supported on the output shaft; and
   the second rotary member is a speedometer worm gear supported on the output shaft.

5. The rotary member mounting structure as recited in claim 1, wherein
   the rotary shaft is an output shaft of a transmission;
   the first rotary member is a drive gear supported on the output shaft; and
   the second rotary member is a speedometer worm gear supported on the output shaft.

6. The rotary member mounting structure as recited in claim 5, wherein
   the at least one axially extending groove of the rotary shaft includes a plurality of spline grooves;
   the at least one elongated protrusion of the first rotary member includes a plurality of splines; and
   the at least one rotation preventing protrusion of the second rotary member includes a plurality of rotation preventing splines.

7. The rotary member mounting structure as recited in claim 1, wherein
   the rotation preventing structure of the rotary shaft is provided on the larger diameter portion of the rotary shaft.

8. The rotary member mounting structure as recited in claim 7, wherein
   the second rotary member includes a rotation preventing portion engaged with the rotation preventing structure on the larger diameter portion of the rotary shaft.

9. The rotary member mounting structure as recited in claim 8, wherein
   the rotation preventing structure of the rotary shaft is formed on an external surface of the rotary shaft and meshes with an internal surface of the rotation preventing portion of the second rotary member.

10. The rotary member mounting structure as recited in claim 9, wherein
    the rotation preventing structure of the rotary shaft and the rotation preventing portion of the second rotary member have corresponding mating grooves and protrusions.

* * * * *